Figure 1:
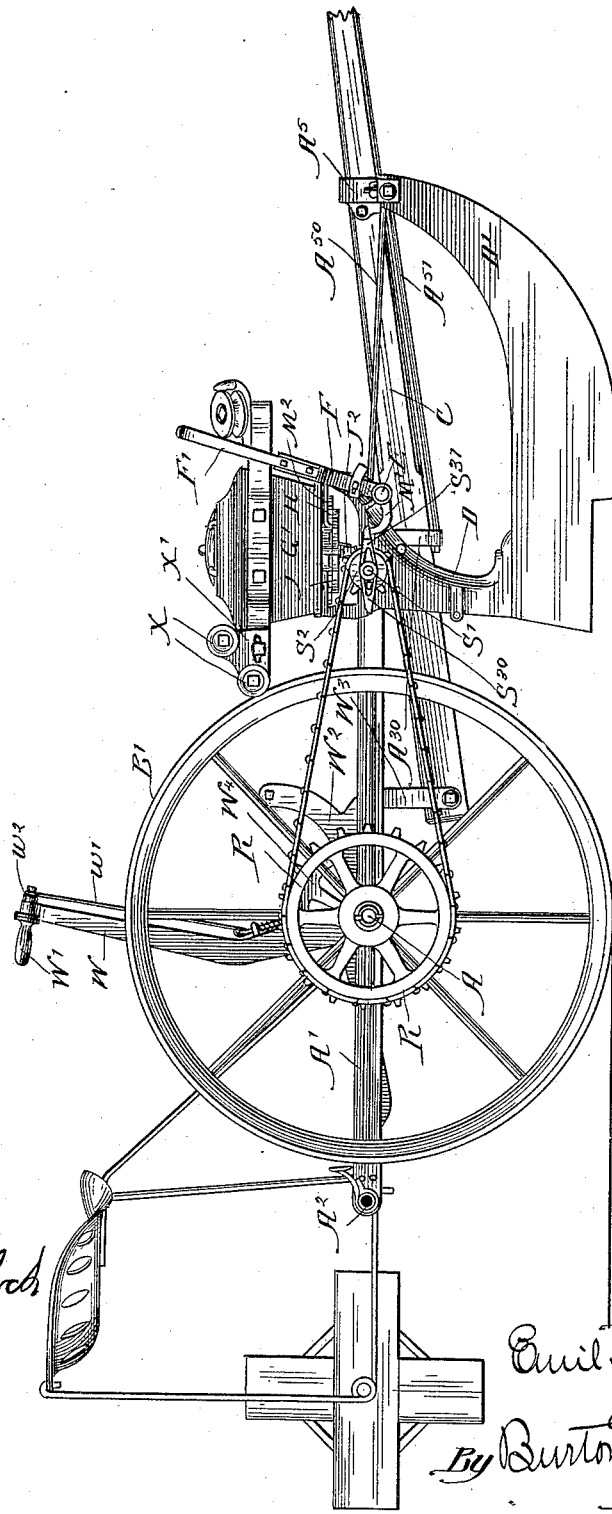

(No Model.) 5 Sheets—Sheet 1.

E. TYDEN.
PLANTER.

No. 445,604. Patented Feb. 3, 1891.

Witnesses
H. P. Halloch
Jean Elliott

Inventor:
Emil Tyden
By Burton and Burton
Attorneys

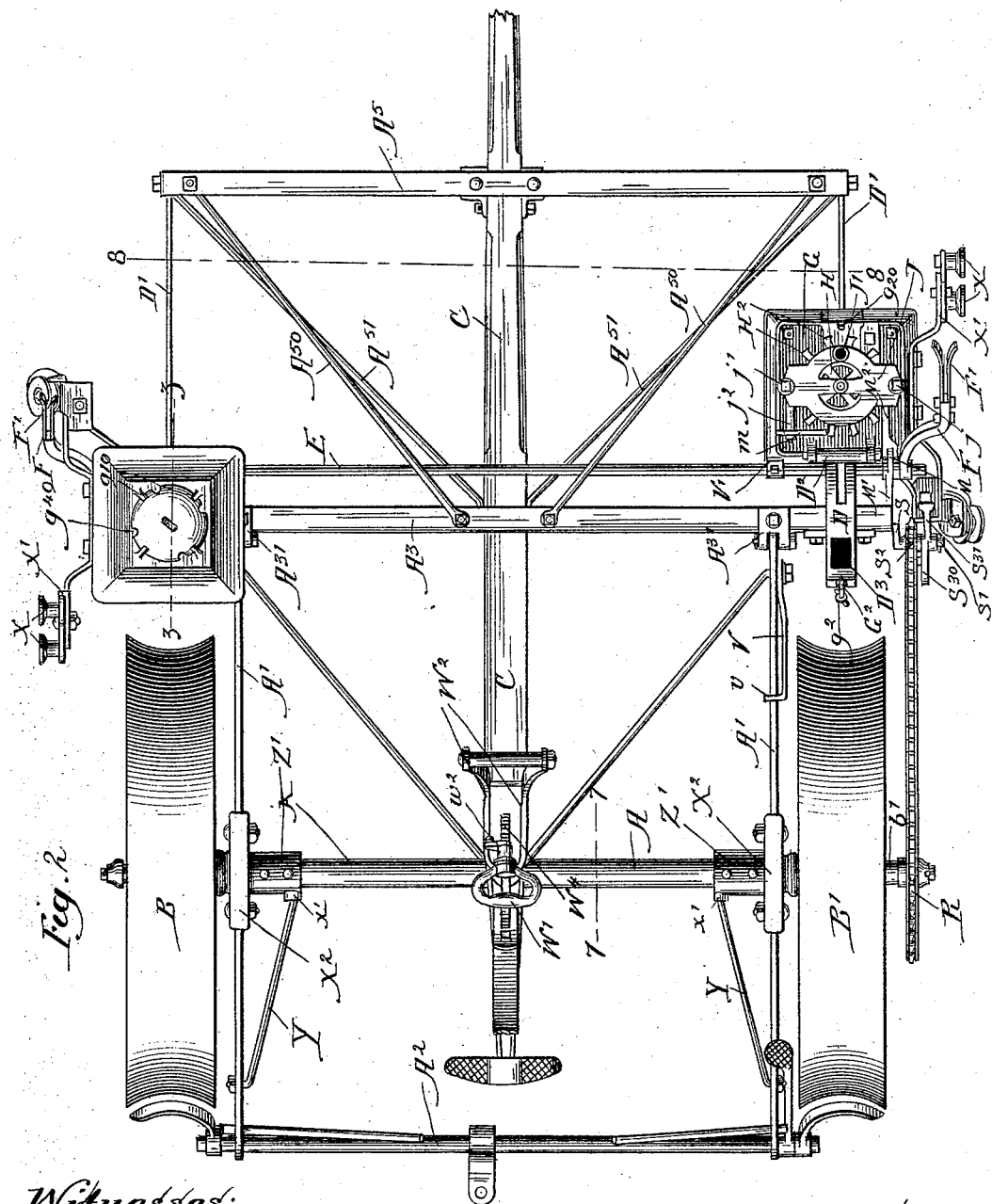

(No Model.)
E. TYDEN.
PLANTER.
No. 445,604.
5 Sheets—Sheet 3.
Patented Feb. 3, 1891.
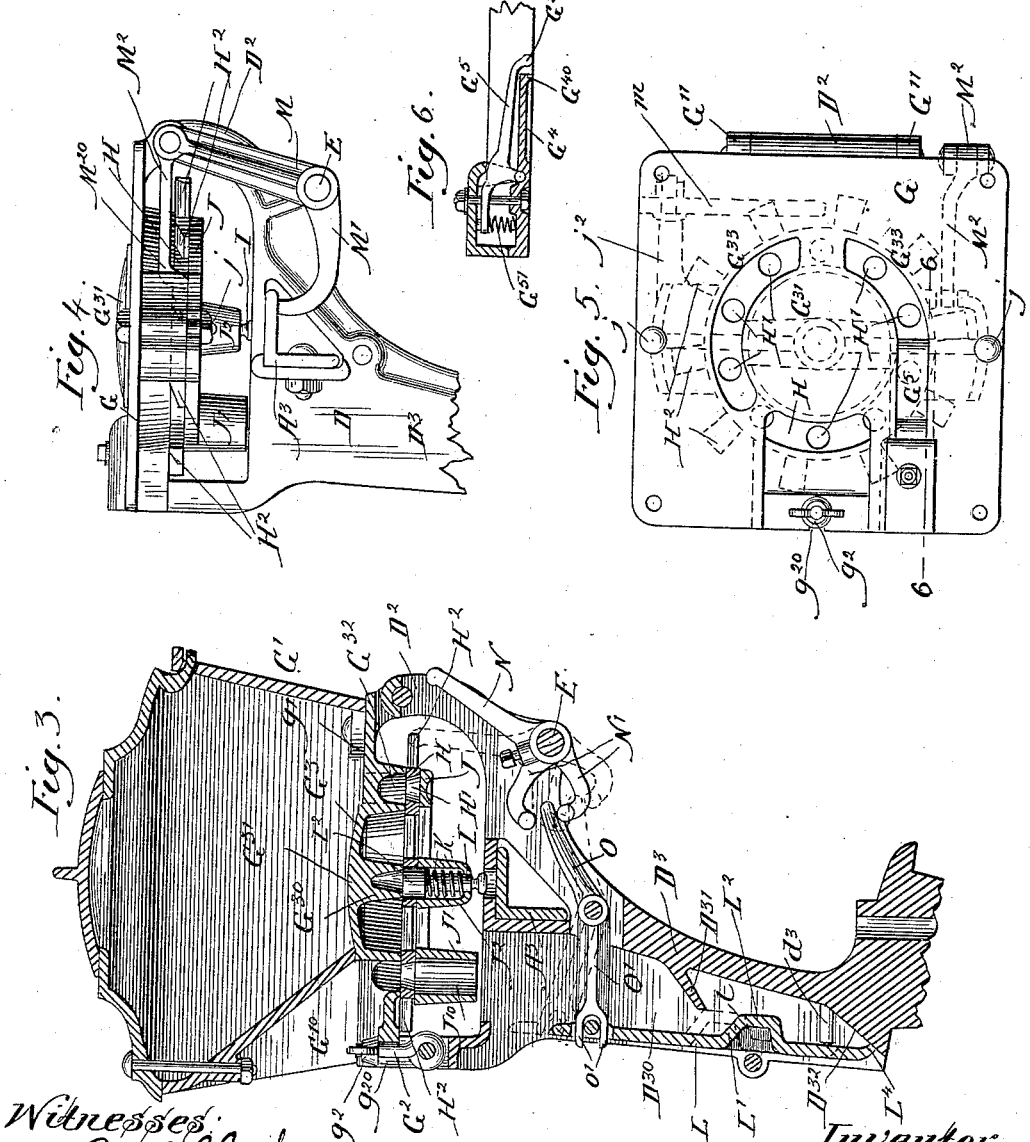

(No Model.)
5 Sheets—Sheet 4.
E. TYDEN.
PLANTER.
No. 445,604.
Patented Feb. 3, 1891.
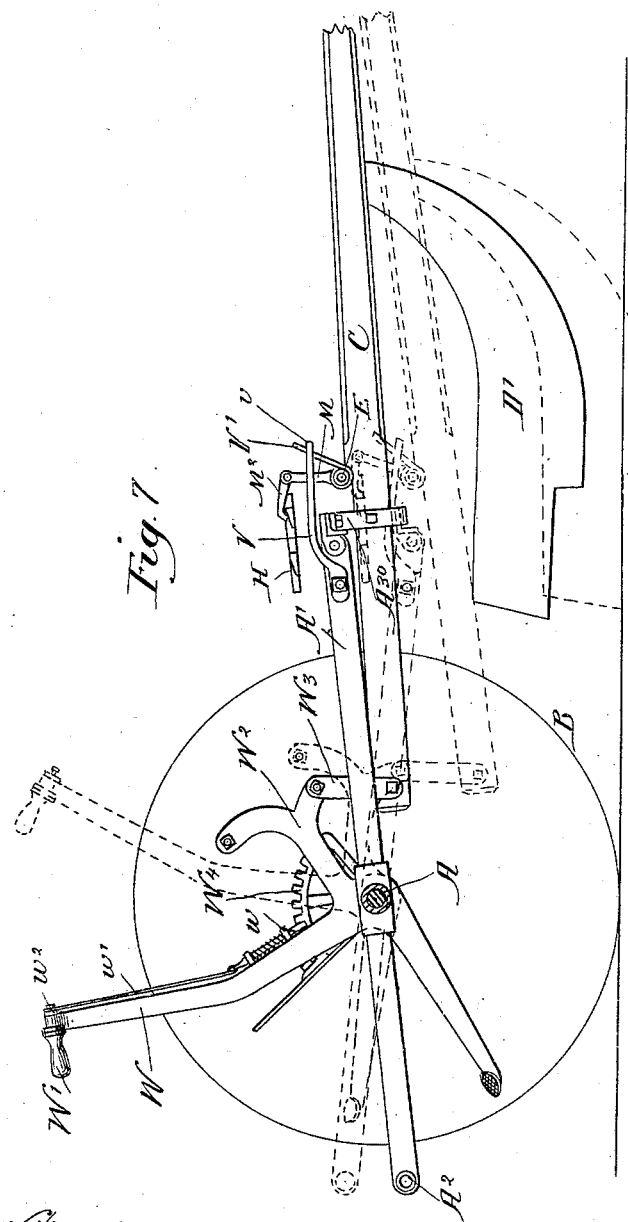
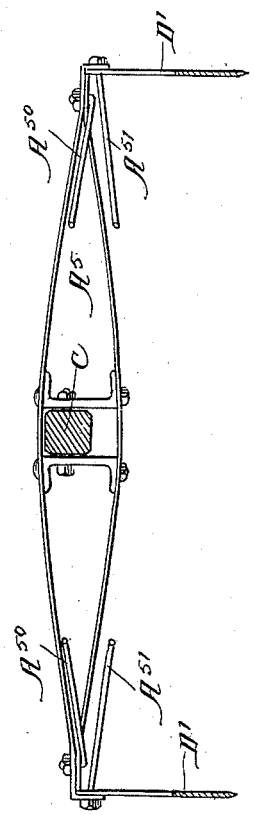

(No Model.)   5 Sheets—Sheet 5.
E. TYDEN.
PLANTER.
No. 445,604.  Patented Feb. 3, 1891.
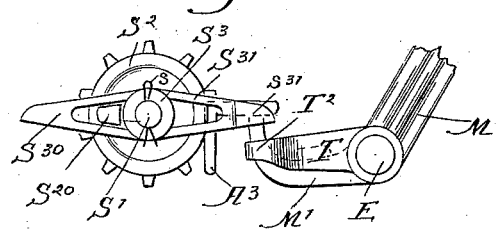
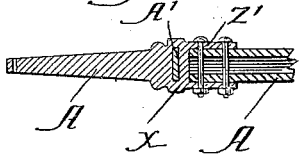
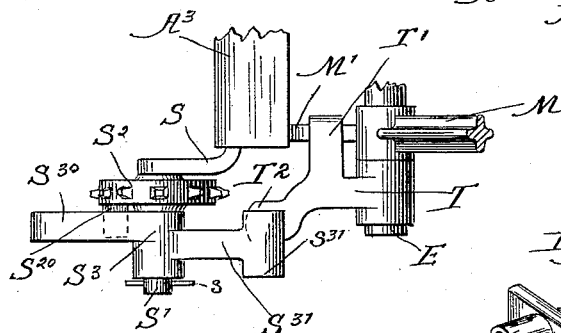
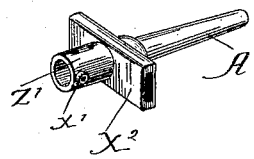
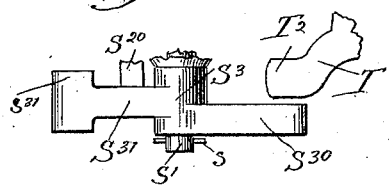
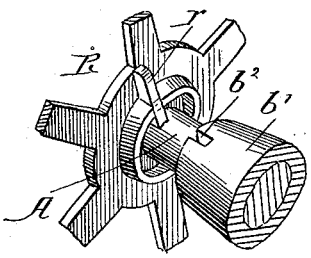
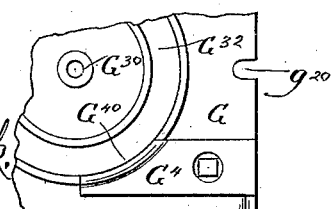
Witnesses:
H. P. Hallock
Jean Elliott
Inventor:
Emil Tyden
By Burton and Burton
Attorneys

UNITED STATES PATENT OFFICE.

EMIL TYDEN, OF CHICAGO, ILLINOIS.

PLANTER.

SPECIFICATION forming part of Letters Patent No. 445,604, dated February 3, 1891.

Application filed October 14, 1889. Serial No. 326,923. (No model.)

*To all whom it may concern:*

Be it known that I, EMIL TYDEN, a citizen of the United States, residing at Chicago, county of Cook, and State of Illinois, have invented certain new and useful Improvements in Planters, which are fully set forth in the following specification, reference being had to the accompanying drawings, forming a part thereof.

The purposes of this construction are to simplify the structure of the planter-frame and obtain rigidity with lightness, to provide improved means to adapt the planting mechanism to be operated either by the drive-wheel or by a check-rower cable at the will of the operator, and to provide improved means to facilitate the change of the planting mechanism to vary the quantity of seed deposited, and to provide mechanism for depositing the seed, improved in details set forth in the claims.

In the drawings, Figure 1 is a side elevation of a planter containing my improvements. Fig. 2 is a plan showing the hopper and feed mechanism on one side folded forward as it would be placed to get access to the feed disk or chute. Fig. 3 is a vertical section from front to rear through the hopper, feed mechanism, and chute, as at the line 3 3 on Fig. 2. Fig. 4 is a detail side elevation of the feed mechanism. Fig. 5 is a plan of the same. Fig. 6 is a section at 6 6 on Fig. 5 through the bottom disk of the hopper, showing the cut-off. Fig. 7 is a sectional side elevation, section being made at the line 7 7 on Fig. 2, showing tilting mechanism and device for locking the feed mechanism to prevent feeding when the machine is tilted up, the feed-disk and its operating-pawl being shown without the remainder of the hopper and chute. Fig. 8 is a section at the line 8 8 on Fig. 2. Fig. 9 is a detail side elevation of tripping mechanism for operating the feed by the rotation of the supporting-wheel without any check-rower cable. Fig. 10 is a plan of the parts shown in Fig. 9. Fig. 11 is a plan of the operating-trip, which is shown in Figs. 9 and 10, in a position the reverse of that shown in Fig. 10. Fig. 12 is a detail perspective showing the mode of attaching to the hub of the supporting-wheel the sprocket-wheel which drives the tripping mechanism. Fig. 13 is a detail plan of part of the under side of the bottom of the hopper, showing the cut-off. Fig. 14 is an axial section through the trunnion which forms the wheel-bearing and adjacent portion of the axle. Fig. 15 is a perspective of the trunnion.

I will distinguish the parts of this machine as to its frame-work by the terms "wheel-frame," comprising the rigid frame, which includes the axle on which the supporting-wheels are journaled, and the "planter-frame," comprising the parts which maintain in rigid relation to each other the two planting mechanisms, one on each side in the usual position with respect to the supporting-wheels—that is to say, in front of them, respectively.

The wheel-frame comprises the axle A, side bars A' A', the rear tubular bar $A^2$, and the necessary braces to retain the several parts in rigid relation to each other. The planter-frame comprises the angle-bar $A^3$, the truss $A^5$, the braces $A^{50}$ $A^{50}$, extending from the ends, respectively, of the truss $A^5$ convergingly toward the middle and rearward to the upper side of the angle-bar $A^3$ and the braces $A^{51}$, which also extend from the ends, respectively, of the truss $A^5$ convergingly toward the middle and rearward to the lower end of the bracket-loop $A^{30}$, which is rigidly secured to the angle-bar $A^3$ and constitutes practically a downward extension thereof at the middle point, said loop being one of the points of fastening for the tongue C, which passes through the loop and is bolted thereto, and being very rigid in its relation to the bar $A^3$, by reason of the fact that it rests in the angle of said angle-bar, being bolted to its horizontal flange and braced by its vertical flange. These two frames are pivoted together just rearward of the angle-bar $A^3$, to which are secured the hinge-pieces $A^{31}$, which receive the forward ends of the side bars A', completing the hinges. It will be observed that the braces $A^{50}$, fastened to the bar $A^3$ at the upper side, and $A^{51}$, fastened to the bracket $A^{30}$ at the lower side, and both fastened at the end of the truss $A^5$, though not at the same point, form practically two sides of a triangle, of which the base is the bracket $A^{30}$, whereby the truss $A^5$ is made rigid against vertical displacement relatively to the remainder of the planter-frame. Lateral displacement of the truss $A^5$ by any strain is also prevented by the bars $A^{50}$, as well as by the bars $A^{51}$, extending from opposite ends of the truss convergingly rearward to their fastenings. The angle-bar $A^3$ extends laterally beyond the side bars $A'$ $A'$, and to its extended portion there is secured the bracket D, the mode of fastening being best seen in Fig. 4, where the bracket is shown with an opening through it from side to side, adapted to admit the angle-bar and afford surfaces to fit it closely, the bracket having flanges bounding this opening, through which fastening-bolts may be inserted. This bracket D supports and contains the bearings for the feed mechanism at the upper end, and at the lower end affords means of securing the shoe $D'$. This shoe extends from its fastening at the lower end of the bracket D and upward in the usual shape, and is at its upward forward end bolted fast to the end of the truss $A^5$, the fastening at that point being conveniently effected by the end of the rod or brace $A^{51}$, which serves as the bolt.

I will now describe the hopper and feed mechanism in its construction and operation, first as operated by the check-rower cable. As stated, the bracket D supports at the upper end the feed mechanism and hopper. It should be said that precisely similar brackets D are provided for the two sides, and that said brackets are secured in a precisely-similar manner upon the opposite protruding ends of the bar $A^3$. In these two similar brackets the rock-shaft E is journaled, having a bearing in each bracket, said rock-shaft being forward of the bar $A^3$ and extending between the brace-bars $A^{50}$, which pass above it, and $A^{51}$, which pass below it. This rock-shaft has the several lever-arms which operate and control the feed mechanism, as will be hereinafter explained, and to either end of this rock-shaft, outside of its bearing in the bracket, there is secured the lever F, to the upper end of which is secured the fork $F'$, with which the knots on the cable engage to operate the feed mechanism when it is operated by the check-rower cable. The bracket D has the arm $D^2$, extending upward and forward from the point where the bar $A^3$ is bolted, said arm $D^2$ forming one member of the hinge by which the hopper is hinged to the bracket. Below the point of fastening to the arm $A^3$ the bracket has the leg $D^3$, which contains the chute by which the grain descends to the point of discharge through the shoe $D'$ into the furrow or drill made in the soil by said shoe. This grain-chute will hereinafter be described in connection with the operation of the feed mechanism.

Returning now to the consideration of the hopper and the mechanism which immediately controls the escape of the grain therefrom, it should be noticed that the hopper comprises the bottom disk G, which has the lugs $G^{11}$, constituting, with the arm of the bracket, the hinge by which the hopper is joined to the bracket. To this bottom disk the inclosing wall $G'$ of the hopper is bolted or riveted, said wall being provided with the lugs $g'$ for that purpose. The wall $G'$ is indented at the rear side at the part $G^{10}$, leaving a portion of the bottom disk G, which projects beyond the wall $G'$ and is overhung by said portion $G^{10}$ of the wall. This indentation is deep enough to uncover one of the grain-openings $G^{32}$ in the bottom disk, hereinafter described. Through a notch $g^{20}$ in said projecting and overhung portion of the bottom disk the swivel-bolt $G^2$, which is pivoted in the bracket D, projects upward, the thumb-nut $g^2$ being applied to said swivel-bolt above the bottom disk, and thereby clamping it fast onto the bracket, when desired, by loosening the clamp-nut. The swivel-bolt may be rocked on its pivot rearward out of the notch $g^{20}$, and the entire hopper, with its bottom disk, may be thus released from its bottom edge and rocked forward over its hinge-connection at the forward edge, as described, and thrown into the position shown in the right hopper in Fig. 2, exposing the upper end of the chute in the leg $D^3$, and also the feed-disk, which is applied on the under side of the bottom disk, as will now be described.

The bottom disk has the central boss $G^{30}$ and is hollowed on the under side around such boss underneath the crowning portion $G^{31}$, and has the annular groove $G^{32}$ concentric with the boss outside of the circle which bounds said crowning portion, and is cut through the upper side throughout detached portions of this annular groove, making the segmental openings $G^{33}$, through which the grain may escape from the hopper into said annular groove and therein rest upon the feed-disk H and pass through its apertures $H'$.

The feed-disk H has a series of holes $H'$ in a circle underneath the annular groove $G^{32}$, and has also peripheral teeth $H^2$, in number corresponding to the holes $H'$. Below the feed-disk H the plate J is located and retains the feed-disk between it and the bottom of the bottom disk. This plate is secured in place by the bolts $j$, which pass through it outside of the circle in which the teeth $H^2$ lie and enter the bottom disk. The plate has projecting from its underside the spout or nipple $J'$, and through the opening $J^{10}$ extends to the top of said plate, this opening being below the path of the holes $H'$ as the disk H revolves and in line below the indented portion of the hopper-wall. The plate J has also the boss $J^2$ at the center, which is bored out from the upper side, forming a cavity, in which is placed the pivot-bolt I, which stops against the central boss $G^{30}$ of the bottom disk and serves as the pivot for the feed-disk, a spring K, coiled around said pivot-bolt within the cavity in the boss $J^2$ and stopped against the under side of the enlargement $I^2$, tending to force said pivot-bolt upward and hold it in position to serve as pivot of the feed-disk, as stated. This pivot-bolt has its stem protruding downward through the end of the boss $J^2$, and is provided with a knob forming a suitable handle, by which it may be grasped to retract it when it is desired to release the feed-disk and remove it for the purpose of substituting another having feed-holes of different size adapted to feed faster or slower.

$G^4$ is the cut-off, being a metal lip which is bolted to the bottom disk on the under side of the latter in a position tangent to the annular grooves $G^{32}$—that is, one edge being tangent to one edge of the groove and the other edge tangent to the other edge of the groove—the said lip being let into the bottom of the bottom disk and having its end $G^{40}$ flush with the margins of the groove, so that it rests on the top surface of the feed-disk H, and as each of the holes H′ passes under the said edge the lip cuts off all the grains, except so many as can lie in the hole H′ in the thickness of the feed-disk. In order to prevent the breaking or shearing in two of grains which might encounter the edge of the rigid lip $G^{40}$, a yielding cut-off $G^5$ is also provided, pivoted on the upper side of the rigid cut-off $G^4$, and having a rounded lip $G^{50}$, hanging over the end of the cut-off $G^4$ in the annular groove $G^{32}$ and resting on the feed-disk, a spring $G^{51}$ at the opposite end holding it yieldingly in this position. If a grain happens to lie in a position in which it would be cut in two by the rigid cut-off, it will encounter first the yielding cut-off and probably be pushed aside while the cut-off is yielding partly to it and prevented from being cut in two. It will be observed that the pivot of this yielding cut-off is brought as nearly as possible down to the plane of its edge $G^{50}$. This causes the device when it encounters a grain which ought to be displaced by it to accommodate itself more readily to the grain than if its pivot were higher, and this is one reason for making the rigid cut-off a removable piece let into the bottom of the bottom disk, as shown, because this construction makes it convenient to assemble the parts and obtain pivotal bearing for the yielding disk without adopting a form for the bottom disk which would permit the introduction of the yielding cut-off from above, such form being very difficult to mold and cast properly or reliably.

The discharge-nipple J′ overhangs the chute or downward passage $D^{30}$ in the leg $D^3$, and grain which passes through said nipple as the feed-disk is revolved descends by said chute to the discharge-point at the heel of the shoe D′. A valve L in this chute controls the grain in a manner to prevent more than one charge being delivered at once, as will hereinafter be explained in connection with the description of the operating mechanism. On the rock-shaft E there is fastened the bell-crank lever M M′, of which the arm M extends upward and has pivoted to it at the upper end the pawl $M^2$. This pawl projects rearward and has its nose $M^{20}$ extending downward between the teeth $H^2$ of the feed-disk H and resting normally upon the plate J. Said teeth $H^2$ are beveled at the upper edge, as seen in Fig. 4, and the nose of the pawl is also somewhat beveled, so that in its forward movement it will slide upon the teeth; but the forward end of the nose is square and the rear edges of the teeth are likewise square, so that in the rearward movement it will engage the teeth and actuate the disk positively. A check or detent pawl $m$ is pivoted to an arm $j^2$ on the plate J and has its nose projecting into the path of rotation of the teeth $H^2$ and adapted to be lifted by them as they successively revolve past under it and to drop in behind them successively and lock the feed-disk against backward rotation. The other arm M′ of the bell-crank lever extends rearward and operates as a stop to check the retracting movement, said stop colliding with and being stopped by the horizontal lip of the angle-bar $A^3$. It is not essential that the two arms M and M′ be arms of the same lever, though this construction is convenient; but they may be detached arms on the rock-shaft E. On the same rock-shaft I make fast the bell-crank lever N N′, of which the arm N is of such length and stands in such position that when the rock-shaft is operated to thrust the pawl rearward and cause it to feed the disk H said arm N will enter between the teeth $H^2$ before the limit of the feeding-stroke of the pawl is reached, and will in that position serve to arrest the rotary movement which the pawl will communicate to the disk, and so prevent overfeeding, which might result from the impetus given the disk by the pawl. The other arm N′ of this lever is conveniently or preferably made double—that is, consisting of two arms constituting a fork, both which arms extend substantially rearward and engage between them the arm O of the lever O′, said lever being pivoted just below the angle-bar $A^3$ in the bracket D, and having its arm O′ projecting rearward through the grain-chute $D^{30}$ in the leg $D^3$. The rear end of the arm O′ of this lever terminates in a fork $o'$, which engages the sliding valve L, which constitutes in fact the entire rear wall of the grain-chute $D^{30}$, being guided by beads at the rear edge of the side walls of said chute and by the transverse bead $d^3$ on the side wall near the bottom of the chute, and further kept in place by the said lever-arm O′ by means of the engagement of the fork $o'$, as described.

The rock-shaft E is operated by the engagement of the knot on the check-rower cable with the fork F′ of the lever F in the familiar manner of such devices, said lever being pivoted on the rock-shaft and having the adjustable finger, which engages the lever-arm M of the lever M M′, and as the lever is rocked rearward and by means of the lever-arm M actuates the pawl $M^2$, causing it to operate the feed-disk, as described, the arm N′ of the same lever engages the arm O of the lever O' and depresses it, thereby causing the arm O' to be elevated and to lift the valve L from the position in which it is shown in full lines in Fig. 3 to the position shown in dotted lines. The described movement of the pawl M²—that is to say, its feeding movement rearward at its limit—brings one of the holes H' in the feed-disk H coincident with the spout or nipple J' on the plate J and causes the number of grains which can be contained in one of the holes H' to be dropped through the spout into the grain-chute. The simultaneous movement of the valve L upward brings the corner $l$ of an intruding portion L' L² L³ of said valve to the edge of the partial diaphragm D³¹, which protrudes from the forward wall of the chute D³⁰ rearward about halfway across the chute, and extends through the entire width of the chute from right to left. When the corner $l$ reaches the edge of the diaphragm D³¹, the oblique portion L' of said valve, together with the diaphragm, constitutes a complete partition across the chute, and as the valve is further elevated the edge of the diaphragm D³¹ continues in contact with the vertical portion L² of the valve, whereby said partition is maintained for the remainder of the upward and corresponding portion of the downward movement of the valve. The contact of the vertical portion L² with the edge of the diaphragm D³¹ will occur before or by the time the hole H' in the feed-disk has reached the spout or nipple J', so that the partition described in the chute will have been effected and the chute cut off at that point before the grain has had opportunity to fall through the nipple J' into the chute. When it falls, it will lodge on the upper side of that partition—that is, in the angle between the diaphragm D³¹ and the valve which contacts its edge—and will there remain until the descent of the valve has carried the corner $l$ below the edge of the diaphragm. This descent is effected by the reverse movement of the whole mechanism, commencing with the lever F, which is caused by the spring in the usual manner, and is therefore practically instantaneous, so that before the grains lodged on the diaphragm D³¹ can escape past its edge and around the intruding portions of the valve L the valve will have completed its descent and its lower lip L⁴ will have reached its seat—the oblique face D³² of the forward wall of the chute D³⁰—and the grains then falling past the intruding portion of the valve will lodge in the angle between said oblique face and the lower lip of the valve, and will there remain, ready to be dropped through the shoe into the furrow the next time the valve is elevated. It will be seen thus that the grain which escapes through the feed-disk at one actuation of the mechanism is not deposited in the furrow at that time, but at the next time the disk is elevated. The purpose and result of this construction may be understood by considering that in the absence of the intermediate cut-off afforded by the intruding portion of the slide L, if the planter should happen to come to a halt while the knot on the cable was engaged with the lever F and holding it at the position to allow the grain to pass into the chute, this being also necessarily the instant at which the preceding charge passes into the furrows, two charges would be deposited at one point, and when the planter started again the next hill would receive no seed. The intermediate cut-off prevents this possibility by making it impossible that grain should reach the furrow at the same operation of the feed mechanism which causes its escape from the hopper.

If the operator finds at any time that the seed is not being dropped in accurate position to make straight cross-rows, he will adjust the finger to cause it to engage the lever-arm M sooner or later, as the case may require, with respect to the time of the engagement of the knots on the cable with the fork F', and a corresponding adjustment of the cable-guide pulleys X X will be made, the bracket on which said pulleys are journaled being secured by bolts through elongated holes to permit such adjustment.

Thus far the feeding mechanism has been described as if it were to be operated only by the check-rower cable; but in many instances it may be found more desirable to operate it by devices dependent upon the rotation of the supporting-wheels of the machine instead of by a cable fixed over the field, and for this purpose I provide the sprocket-wheel R, which is adapted to be secured on the axle adjacent to either supporting-wheel and operated thereby; but since it is not necessary that more than one such wheel should be employed, and since, in whatever direction the machine is driven, it is immaterial by which wheel it is operated, it is not necessary to provide means for securing it, except at one end of the axle, and, as illustrated, and as most convenient in operation, it is applied adjacent to the right-hand wheel. The hub of the supporting-wheel is turned down on the outer side, and is provided at the end with the key-notch $b^2$, and the hub of the sprocket-wheel R is bored out to fit the end of the axle and furnished with a key $r$, adapted to enter the key-notch $b^2$ and lock the sprocket-wheel to the hub, so that it may be rotated by the supporting-wheel. When placed in position, as described, and as may be understood from Fig. 12, wherein the parts are shown separated, but in the position to be advanced into engagement, a linchpin is inserted through the axle outside the sprocket-wheel, and thereby both the sprocket-wheel and supporting-wheel are retained in place on the axle, and the sprocket-wheel being fitted to the axle is driven accurately notwithstanding any looseness of the supporting-wheel on the axle. To the vertical lip of the angle-bar A³, at the end, I secure the angle-bracket S, having an arm projecting rearward provided with a stud S', projecting rigidly outward from it, and on the stud next to the bracket there is journaled the sprocket-wheel $S^2$, while on said stud, outside the sprocket-wheel, there is pivoted the lever $S^3$, both wheel and lever being kept in place on the stud by the linchpin $s$, inserted through the stud outside the lever. When the feeding is to be effected by means of this mechanism, the lever F is removed from the end of the rock-shaft E, and in its place there is substituted the lever T. This lever T has the arm or finger T', projecting upward and overhanging the arm M' of the lever M. The lever $S^3$ comprises a hub, by means of which it is journaled on the stud S', and two lever-arms projecting from said hub, the arm $S^{30}$ being at one end of the hub, and being in width somewhat less than half the length of the hub, while the arm $S^{31}$ projects from the middle of the hub and ends in a cross-arm $s^{31}$, whose length is equal to that of the hub. It will thus be seen that the path of the end of the arm $S^{30}$ as the lever revolves will be somewhat less than half of the width of the path of the arm $S^{31}$. The lever T has the end $T^2$ projecting rearward into the path of rotation of the cross-arm $s^{31}$ of the lever-arm $S^3$; but said end $T^2$ in width occupies only half or somewhat less than half the width of the path of rotation of said cross-arm. When the lever $S^3$ is placed on the stud S', as shown in Fig. 10, with its arm $S^{30}$ at the inner side, it will be seen that the end $T^2$ of the lever T is in the path of rotation both of the lever-arm $S^{30}$ and the cross-arm $s^{31}$, and when the lever $S^3$ is in this position its rotation will cause both the arms $S^{30}$ and $S^{31}$ to collide with and actuate the lever T and cause its arm T' to actuate the lever M by its engagement with the arm M' of said lever, rocking the lever on its shaft E and causing it to actuate the pawl $M^2$, and the remaider of the feeding mechanism in precisely the same manner as said pawl and mechanism are actuated by check-rower-cable knots engaging with the fork F' of the lever F when that mode of actuation is employed. When the lever $S^3$ is thus placed, therefore, the feed mechanism will be actuated and the seed deposited twice for each revolution of the wheel S. If it is desired to deposit seed only once for each revolution of said wheel, the lever $S^3$ will be reversed to the position shown in Fig. 11, wherein the path of the arm $S^{30}$ being transferred to the outer side the end $T^2$ of the lever T does not stand in said path, but is only in the path of the cross-arm $s^{31}$ of the lever-arm $S^{31}$, and is therefore actuated only once in each revolution of the lever. The lever $S^3$ is rotated, it will be observed, by being engaged by the lateral projection $S^{20}$ on the sprocket-wheel $S^2$, said projection entering the lever, as shown in Figs. 9 and 10.

When the feeding mechanism is actuated by the tripping devices connected with the wheel S last above described, it is important that such actuation should occur only when the machine is traveling in the direction of the desired rows and forming the furrows in which the seed is placed, and therefore that such actuation should be prevented when the machine is turning around at the end of each furrow preparatory to starting on the next furrow. In this process of turning around the shoe is always elevated out of the ground, which is done by tilting the machine.

Fig. 7 illustrates the mechanism for tilting which I employ, consisting of the lever $W W^2$, pivoted on the axle and having the handle W' within reach of the driver, and having its arm $W^2$ projecting forward and connected by the link $W^3$ to the rear end of the tongue C, a notched segment $W^4$ being provided, made rigid with the axle, and a suitable dog being provided on the arm W of the lever $W W^2$, connected by the link $w'$ to the crank $w^2$ on the handle W' at the end of said lever-arm W. The mode of tilting and locking the machine in elevated position will be obvious from inspection of this construction. The driver, in order to elevate the machine, first turning the handle W' in its journal-bearing at the end of the lever-arm W, and thereby disengaging the dog $w$ from the notch-segment $W^4$, will then pull the said lever-arm W rearward, so elevating the rear end of the tongue, and with it the frame-bar $A^3$, brackets D, feed mechanism, and shoes D', connected to said brackets, the parts coming to the position shown in dotted line in Fig. 7. In this operation two points have remained at the same height as before it was performed—to wit, the end of the tongue which is sustained by the neck-yoke and the axle A. The wheel-frame having rocked over the axle, its forward end rising, and the tongue having rocked over the neck-yoke, its rear end and planter-frame thereon rising, the relation of the planter-frame and wheel-frame has changed. I take advantage of this change of relation to prevent automatically, by means of it, the action of the feeding mechanism when the machine is in this elevated position. This is accomplished by means of the latch V, which is fastened to the frame-bar A', and when thrown forward, as it appears in Fig. 7, engages a lever-arm V', which is fastened to a rock-shaft E. The latch may remain permanently thrown forward, if preferred, or it may be thrown forward only at the time of tilting the machine up. When the machine is in its lower position operating to form the furrow, the shoe being on or in the ground, the end $v$ of the latch V does not engage the lever-arm V' or prevent its full rocking movement, as effected normally by the tripping mechanism described, and therefore does not interfere with the operation of the feeding mechanism; but when the machine is elevated, as shown in full lines in Fig. 7, the change of relation being equivalent to revolving the shaft E about the pivotal axis of the two frames, said end $v$ of the latch will check the lever-arm V' and prevent the rock-shaft from having its full motion, so that although the revolution of the drive-wheel may contine to actuate the lever T, as before, said lever will be prevented from returning to its normal position, and will therefore stand in position to be actuated by said lever $S^3$ only about half the distance necessary to carry the pawl back over the tooth $H^2$ of the feed-disk, so that said pawl will fail to engage the new tooth, but will play idly back and forth between the same two consecutive teeth so long as the machine remains elevated and traveling over the ground.

The construction of the wheel-frame in respect to certain details not hereinafter described I consider important, and will now describe the same.

The axle A is made up of the middle portion, which is tubular, and the trunnions Z Z, which are secured onto the tubular portion and constitute the immediate bearing for the supporting-wheels. Each of these trunnions comprises a sleeve $Z'$, which receives the tubular part A of the axle and is bolted fast to it, and a transverse extending portion $X^2$, through which there is formed a seat for the side bar $A'$, which is inserted therethrough and bolted fast therein substantially in the plane of the tubular part A of the axle. The sleeve $Z'$ is of considerable length for two reasons: first, that it may obtain the firmer hold upon the tubular part A, and, second, that it may afford, as it does, means for fastening one end of a brace Y, which is made fast in a small boss $x'$ at the inner end of the sleeve $Z'$, and extends thence rearward and toward the supporting-wheel, and is made fast at the other end to the side bar $A'$, constituting an oblique brace and very much stiffening the rear ends of the side bars.

I claim—

1. In a planter, in combination with the wheel-frame, the planter-frame pivoted thereto, comprising the transverse bar $A^3$ and the truss $A^5$ parallel thereto, and the braces $A^{50}$ and $A^{51}$, secured at the ends, respectively, of the truss $A^5$, the braces $A^{50}$ being secured to the bar $A^3$ at its upper side near the middle, and the braces $A^{51}$ being made rigid with said bar near the middle below the same, substantially as set forth.

2. In a planter, in combination with the planter-frame comprising the bar $A^3$, having rigid with it the loop-bracket $A^{30}$ near the middle, the truss $A^5$, and the braces $A^{50}$ and $A^{51}$, the tongue extended through the truss $A^5$ and bolted to its struts, and extending also through the loop-bracket $A^{30}$ and bolted thereto, substantially as set forth.

3. In a planter, in combination with the hopper, the feed-disk pivoted below it, and a spring-actuated bolt which constitutes the pivot, said bolt being provided with a handle by which it may be withdrawn to release the disk and permit its removal, substantially as set forth.

4. In a planter, in combination with the hopper and its bottom disk having apertures to permit the downward escape of the corn, the plate H, secured to the under side of the hopper-bottom, the feed-disk located between said plate and the hopper-bottom, said plate having the boss $J^2$, provided with a cavity, the bolt I, located in said cavity, and a spring, also within the cavity, operating upon the bolt to force it upward and cause it to protrude above the surface of the plate and into the center of the feed-disk, said bolt being provided with a handle which protrudes from the boss at the lower end, whereby it may be retracted to release the disk, substantially as set forth.

5. In a planter, in combination with the hopper, the plate J, secured to the bottom of the hopper, with an intervening space between them under the central part of the hopper, the feed-disk located in such space and adapted to be withdrawn edgewise therefrom, and a removable pivot for such disk which retains it in such space when in place, substantially as set forth.

6. In a planter, in combination with the hopper, the plate J, secured to the bottom of the hopper, with an intervening space between them under the central part of the hopper, the feed-disk located in such space and adapted to be withdrawn edgewise therefrom, a bolt suitably retained in the plate J and projecting above the same into the feed-disk to serve as the pivot for the latter, such bolt extending through the plate and accessible and removable at the under side, the hopper being pivotally connected to the planter-frame and adapted to be turned bottom upward thereon, substantially as set forth.

7. In a planter, in combination with the hopper having the bottom disk provided with apertures $G^{33}$, located in a circle and leading up through the bottom into the hopper, the plate J, bolted onto the bottom of the bottom disk, said feeding-disk having a series of openings $H'$ arranged in a circle underneath the circle in which the apertures $G^{32}$ in the bottom disk are located and pivoted at the center of such circle, the plate J, having an aperture $J'$, located in position to coincide with said holes successively as the disk revolves, but not underneath any of the apertures $G^{33}$ which lead into the hopper, and mechanism whereby the disk is rotated intermittingly a distance from one hole to the next at each impulse, substantially as set forth.

8. In a planter, in combination with a fixed hopper support or standard, the hopper pivoted thereto on a horizontal pivot, whereby it is adapted to be inverted without being detached from the support, the feed-disk pivoted to the hopper-bottom and adapted to be carried by the latter when the hopper is inverted, the pawl-operating arm supported on the fixed hopper-support, and the feed-disk operating pawl pivoted to such arm on a horizontal pivot, such pivot being in line with the hinged pivot when the pawl-operating arm is in a position of rest, substantially as set forth.

9. In a planter, feed mechanism, in combination with the hopper-bottom disk or plate having the annular groove $G^{32}$ in its under side, the cut-off $G^4$, bolted into the under side of the bottom disk and having its edge $G^{40}$ flush with the lower edges of the bounding walls of said annular groove, and the yielding cut-off $G^5$, pivoted on said fixed cut-off, substantially as set forth.

10. In a planter, in combination with the wheel-frame and planter-frame hinged together, the hopper and feeding mechanism located on the planter-frame, a sprocket or equivalent driving-wheel on the axle and rotated by the supporting-wheel of the wheel-frame, a secondary wheel operated by a belt or chain from the first-mentioned wheel and journaled on the planter-frame, the axis of its journal-bearing being coincident with the axis of the hinge whereat the two frames are joined, a trip-arm rotated by said wheel, and a rock-shaft journaled on the planter-frame and having also a lever-arm which protrudes into the path of the revolving trip-arm, whereby the feeding mechanism is actuated automatically by the rotation of the drive-wheel, substantially as set forth.

11. In a planter, in combination with the wheel-frame and the planter-frame hinged together, and mechanism for tilting the machine to elevate the planting mechanism by changing the relative position of the two frames about their hinge connection, the planting mechanism comprising a rock-shaft journaled on the planter-frame and having the lever-arm V', and the latch V on the wheel-frame adapted to engage said lever-arm V' and limit the rocking movement of the rock-shaft when the machine is tilted up, substantially as set forth.

12. In a planter, in combination with the planting mechanism and the rock-shaft which operates it, the lever-arm T, secured to said rock-shaft, the lever $S^3$, rotated by suitable connection with the drive-wheel and provided with two oppositely-projecting arms, one of said arms being at the extremity broader than the other, the lever-arm T having its rear end projecting into the path of rotation of the broader of said arms and also into the path of rotation of the narrower of them when the lever is in one position on its shaft, but out of the path of said lever-arm when the lever is reversed on its shaft, said lever being capable of being reversed on its shaft at will, whereby the feed mechanism may at the will of the operator be actuated once or twice for each revolution of said lever, substantially as set forth.

13. In a planter, in combination with the middle portion of the axle, the trunnions terminating inwardly in sleeves which receive the end of the middle portion of the axle and are bolted thereto, the side bars made fast to the trunnions, respectively, and the braces Y, secured at one end to the inner ends of the sleeves, respectively, and at the other end to the side bars, respectively, substantially as set forth.

14. In a planter, in combination with the middle portion of the axle, the trunnions bolted thereto and having transverse seats extending through them, respectively, the side bars A', inserted through and secured in said seats, said trunnions having also the sleeves X', extending inward from the side bars, and the braces fastened to the inner ends of said sleeves, respectively, and to the side bars at a distance from their seats in the trunnions, substantially as set forth.

In testimony whereof I have hereunto set my hand, in the presence of two witnesses, at Chicago, Illinois, this 1st day of October, A. D. 1889.

EMIL TYDEN.

Witnesses:
JEAN ELLIOTT,
CELESTE P. CHAPMAN.